(12) United States Patent
Nishikawa

(10) Patent No.: US 8,943,495 B2
(45) Date of Patent: Jan. 27, 2015

(54) INFORMATION PROCESSING APPARATUS AND FIRMWARE APPLICATION METHOD

(75) Inventor: Satoshi Nishikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 589 days.

(21) Appl. No.: 13/084,933

(22) Filed: Apr. 12, 2011

(65) Prior Publication Data

US 2011/0276958 A1 Nov. 10, 2011

(30) Foreign Application Priority Data

May 6, 2010 (JP) .................................. 2010-106263

(51) Int. Cl.
*G06F 9/445* (2006.01)
*G06F 9/44* (2006.01)

(52) U.S. Cl.
CPC ........................ *G06F 8/68* (2013.01)
USPC ........................................................ 717/175

(58) Field of Classification Search
None
See application file for complete search history.

(56) References Cited

U.S. PATENT DOCUMENTS

| 8,468,516 B1 * | 6/2013 | Chen et al. ..................... 717/170 |
| 8,495,618 B1 * | 7/2013 | Inbaraj et al. .................. 717/173 |
| 2005/0141025 A1 * | 6/2005 | Hanada ......................... 358/1.15 |
| 2005/0254521 A1 * | 11/2005 | Peng ............................. 370/472 |
| 2006/0271656 A1 * | 11/2006 | Yagawa ......................... 709/223 |
| 2007/0288423 A1 | 12/2007 | Kimoto |
| 2008/0158590 A1 * | 7/2008 | Lim .............................. 358/1.15 |
| 2008/0263540 A1 * | 10/2008 | Bando et al. ................... 717/173 |
| 2010/0079793 A1 | 4/2010 | Nishikawa .................... 358/1.15 |

FOREIGN PATENT DOCUMENTS

| JP | 2003-099297 A | 4/2003 |
| JP | 2006-072761 | 3/2006 |
| JP | 2007-334471 A | 12/2007 |
| JP | 2008-204287 A | 9/2008 |
| JP | 2010-061204 A | 3/2010 |

OTHER PUBLICATIONS

Japanese Office Action issued in counterpart application No. 2010-106263 dated Jan. 21, 2014, along with its English-language translation—12 pages.

* cited by examiner

*Primary Examiner* — Don Wong
*Assistant Examiner* — Daxin Wu
(74) *Attorney, Agent, or Firm* — Fitzpatrick, Cella, Harper & Scinto

(57) ABSTRACT

A PC determines whether or not firmware (a first firmware), which has already been downloaded to an image forming apparatus, is present, and, when the first firmware is present on the image forming apparatus, acquires information about the first firmware and information about a second firmware that matches the image forming apparatus. When the application of second firmware to the image forming apparatus is selected, the PC acquires a difference package corresponding to the difference between first firmware and second firmware based on information about first and second firmware, and applies a difference package and first firmware to the image forming apparatus.

4 Claims, 11 Drawing Sheets

INFORMATION PROCESSING APPARATUS AND FIRMWARE APPLICATION METHOD

BACKGROUND OF THE INVENTION

1. Field of the Invention

The present invention relates to an information processing apparatus and a firmware application method.

2. Description of the Related Art

A monitoring system that remotely monitors the operation state of a peripheral apparatus such as an image forming apparatus and the like has been proposed. In the monitoring environment provided by the monitoring system, it is contemplated that the firmware of the image forming apparatus be updated as a function of the monitoring system. Here, there is a case where the firmware applied to the image forming apparatus needs to be updated due to an upgrade of firmware or a fault occurring in the image forming apparatus. In such a case, conventionally, a service person has had to visit a customer to update firmware manually. Hence, the update of firmware has become a high cost. Accordingly, a technology that stores firmware in a re-writable storage device such as a flash memory or the like, and transmits firmware via Internet by means of an electronic mail or the like to thereby carry out the update of firmware has recently been proposed.

In addition, Japanese Patent Laid-Open No. 2004-256143 discloses a portable electronic device that performs communication via an update server and a communication line to thereby carry out the update of firmware. The portable electronic device automatically accesses the update server at a predetermined timing and transmits a request signal that requests the update of firmware. Then, the portable electronic device receives the firmware transmitted from the update server that has responded to the request signal. Also, when the electric voltage of the battery power source becomes smaller than a predetermined value, the portable electronic device stops the reception of firmware.

Here, under an environment in which the operation state of the image forming apparatus is being remotely monitored, a system in which the updated firmware is downloaded to the update region of the image forming apparatus, and subsequently applies the firmware to thereby carry out the update of firmware is contemplated. However, in the system, when the image forming apparatus cannot ensure a sufficient capacity for the update region of firmware, the following problems may occur. When there is firmware that has already been downloaded to the image forming apparatus, a service person must visit a site, delete the firmware from the image forming apparatus, and then apply the firmware for updating, which has been prepared in advance, to the image forming apparatus. Also, the firmware for updating, which has been prepared in advance, may not be the best one as the firmware to be applied to the image forming apparatus. Furthermore, when the image forming apparatus cannot ensure a sufficient capacity for the update region of firmware despite the fact that the update of firmware to the image forming apparatus has already been reserved, the reservation must be cancelled.

SUMMARY OF THE INVENTION

The information processing apparatus of the present invention is an information processing apparatus provided in a system that monitors the state of an image forming apparatus and distributes firmware to the image forming apparatus. The information processing apparatus of the present invention efficiently updates firmware of the image forming apparatus.

According to an aspect of the present invention, an information processing apparatus provided in a system that distributes firmware to an image forming apparatus via a network is provided. The information processing apparatus includes a first acquisition unit configured to acquire first firmware information, which is information about a first firmware that has already been downloaded to the image forming apparatus; a second acquisition unit configured to acquire second firmware information, which is information about a second firmware that matches the image forming apparatus; a difference data acquisition unit configured to acquire difference data, which corresponds to a difference between the first firmware and the second firmware, based on a comparison result between the first firmware information and the second firmware information when the application of the second firmware to the image forming apparatus is selected; and an application instruction unit configured to provide an instruction about applying the downloaded first firmware and the difference data to the image forming apparatus.

Further features of the present invention will become apparent from the following description of exemplary embodiments with reference to the attached drawings.

DESCRIPTION OF THE EMBODIMENTS

Figure 1:
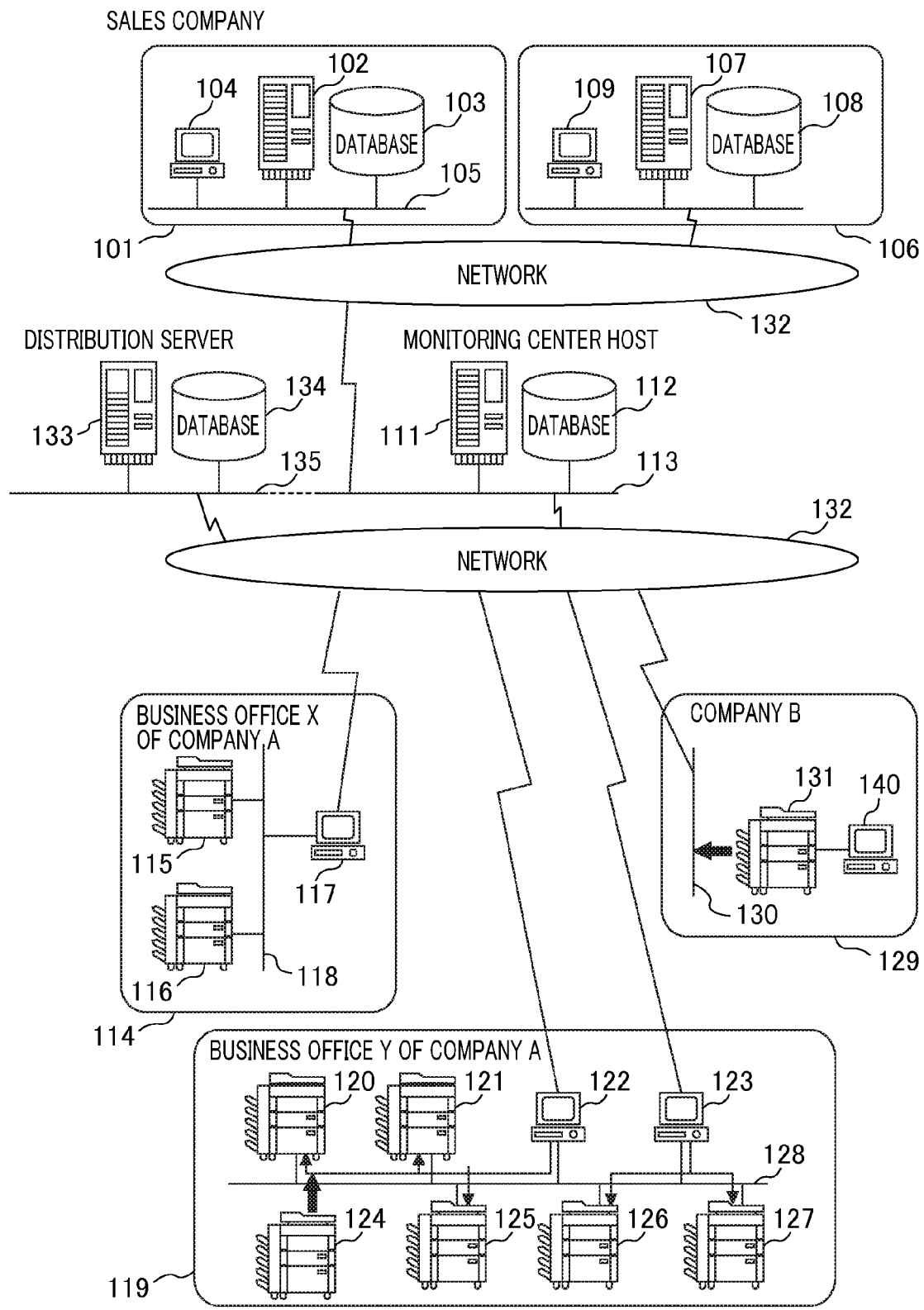
FIG. 1 is a diagram illustrating an example of the overall configuration of a firmware management system of the present embodiment.

FIG. 1 is a diagram illustrating an example of the overall configuration of a firmware management system of the present embodiment. The firmware management system of the present embodiment (hereinafter also referred to as "management system") is a system that distributes firmware to an image forming apparatus via a network according to instructions given by a monitoring device that monitors the state of the image forming apparatus. The management system includes sales company systems (101, 106), customer systems (114, 119, 129), a distribution server 133, and a monitoring center host 111 that are connected to each other via a network 132. The management system further includes a PC (Personal Computer) 140 that is connected to an image forming apparatus 131 provided in the customer system 129. In this example, the network 132 is the Internet.

Each of the sales company systems 101 and 106 is a system of a sales company that sells firmware for the image forming apparatus provided in the customer system. These sales company systems provides a download instruction to the monitoring center host 111 via the UI (User Interface) provided by the monitoring center host 111. The download instruction is an instruction about downloading firmware to the image forming apparatus in the customer system. The sales company system 101 includes a PC 104, a host computer (hereinafter referred to as "host") 102, and a database 103. The PC 104, the host 102, and the database 103 are connected to each other via a LAN 106. The sales company system 106 includes a PC 109, a host 107, and a database 108. The PC 109, the host 107, and the database 108 are connected to each other via a LAN 110. The PC 104 and the PC 109, the host 102 and the host 107, and the database 103 and the database 108 respectively have an identical structure. Therefore, a description will be given below by taking an example of the processing units provided in the sales company system 101.

The PC 104 accumulates sales information about locations and customers managed by a sales company and information about a management system in the database 103 for management. Also, the PC 104 accesses the Web site managed by the monitoring center host 111, and displays information about firmware that is being distributed to the image forming apparatus in the customer system and information about firmware that can be distributed to the image forming apparatus. Then, in response to a user's operation input made through the UI provided by the monitoring center host 111, the PC 104 provides a firmware download instruction to the monitoring center host 111. The host 102 controls the PC 104. The host 102 may have the same function as that of the PC 104.

The monitoring center host 111 receives information about firmware that is being distributed to the image forming apparatus in the customer system and information about firmware that can be distributed to the image forming apparatus from the distribution server 133. The monitoring center host 111 manages the information received from the distribution server 133 on the Web site. Also, the monitoring center host 111 provides a UI for providing a firmware download instruction to a PC (e.g., the PC 104) in the customer system. Also, the monitoring center host 111 provides a firmware distribution instruction to the distribution server 133 in accordance with the download instruction from the PC in the sales company system. The firmware distribution instruction is an instruction about distributing firmware to the image forming apparatus.

Also, the monitoring center host 111 receives information about the operation status of the image forming apparatus to be monitored from the monitoring devices 117, 122, and 123 provided in the customer system via the network 132. The monitoring center host 111 may directly receive information about the operation status of the image forming apparatus and counter information from the image forming apparatus. The monitoring center host 111 stores and manages information about the operation status of the image forming apparatus and counter information that has been received in the database 112 connected through a LAN 113. More specifically, the monitoring center host 111 is a device that monitors the state of the image forming apparatus.

Examples of the operation states of the image forming apparatus include out of toner, door-open, drum replacement, no cartridge, cooling fan operation error, error on base plate, stained document mounting glass, no staple, and deficiency in the quantity of light from a paper feeding sensor. Also, examples of the operation states of the image forming apparatus include font memory overflow, rendering error, fixing device error, counter error, two-sided printing unit error, and paper jamming. In addition, examples of counter information include payment counter information, division counter information, size-by-size counter information, and component counter information. Here, the payment counter information indicates information about a counter value for the image forming apparatus used by each customer, which is a target of payment by a sales company. The division counter information indicates information about the amount of payment to be made by each division of the customer. The size-by-size counter information indicates a counter value for each paper size. The component counter information indicates the level of consumption of each component of the image forming apparatus. The payment counter indicates the number of prints printed by the image forming apparatus. The division counter indicates the number of prints with respect to each division, which is set by the customer. With respect to the component counter, the number of rotations is set as the counter for a component such as a drum or the like, while the time (sec) is set as the counter for a component such as a scanner lamp or the like.

The information about the monitoring device to be monitored, the information indicating the operation state of the image forming apparatus, counter information, and the like are stored in the database 112. The monitoring center host 111 may collect information that relates to the failure occurred in the image forming apparatus from the image forming apparatus to be monitored, and store the information about the failure in the database 112. Also, the monitoring center host 111 may report the information stored in the database 112 to an external apparatus (e.g., the host of a sales company system).

The distribution server 133 transmits information about firmware that is being distributed to the image forming apparatus in the customer system and information about firmware that can be distributed to the image forming apparatus to the monitoring center host 111. Also, the distribution server 133 receives a firmware distribution instruction from the monitoring center host 111, and distributes firmware to the image forming apparatus in accordance with the firmware distribution instruction. The firmware to be distributed is stored in the database 134. The database 134 is connected to the distribution server 133 via a LAN 135. Note that the database 134 may be physically present in the distribution server 133. Provided that the database 134 is accessible from the distribution server 133, the database 134 may be present at other locations connected to the network 132. The LAN 113 and the LAN 135 may be formed as a single LAN so as to share data with the database 134 and the database 112. In addition, the distribution server 133 receives a firmware distribution reservation from the image forming apparatus provided in the customer system via the network 132, and distributes firmware, which has been reserved for distribution, to the image forming apparatus.

Next, a customer-side system will now be described. A management system shown in FIG. 1 includes customer systems 114, 119, and 129. The customer system 114 is a system managed by the business office X of company A. The customer system 119 is a system managed by the business office Y of company A. The customer system 129 is a system managed by company B. In the customer system 114, a monitoring device 117 monitors image forming apparatuses 115 and 116 connected to a LAN 118 connected to the network 132. In the customer system 119, a monitoring device 122 monitors image forming apparatuses 120, 121, 124, and 125 on a LAN 128. Also, a monitoring device 123 monitors image forming apparatuses 126 and 127 on the LAN 128. Each of the monitoring devices has an identical structure. Each of the monitoring devices receives information indicating the operation state and counter information from the image forming apparatus to be monitored in the customer system in which the monitoring devices are provided, and stores them in database (not shown) for management. Also, the monitoring device transmits information stored in the database to the monitoring center host 111 via the network 132. In the customer system 129, the image forming apparatus 131 itself transmits information indicating the operation state of the image forming apparatus 131 and counter information to the monitoring center host 111 via the LAN 130 and the network 132. Furthermore, each of the image forming apparatuses provided in the customer system can make a firmware distribution reservation to the distribution server 133 via the network 132 in accordance with a user's operation input.

HTTP/SOAP protocol is utilized in the communication via the network 132 in the management system shown in FIG. 1. HTTP is an abbreviation for HyperText Transfer Protocol. SOAP is an abbreviation for Simple Object Access Protocol. The SOAP is a protocol for calling data or service stored in one computer from another computer based on XML (eXtended Markup Language). In the present embodiment, the SOAP is implemented on HTTP. In the communication by the SOAP, a SOAP message including an XML document added with associated information is transmitted and received. Accordingly, a computer that supports the SOAP includes a SOAP message generation unit for generating a SOAP message and a SOAP message interpretation unit for interpreting the SOAP message. For example, the SOAP message including information about the operation status of the image forming apparatus described above is transmitted to the monitoring center host 111.

A PC 140 is an information processing apparatus of the present embodiment. The PC 140 is connected to the image forming apparatus 131, and updates firmware applied to the image forming apparatus 131. The PC 140 may be provided in the customer system 129 in advance. When firmware applied to the image forming apparatus 131 needs to be updated, a service person of the sales company may visit the customer system 129 while bringing the PC 140 with him, so that he/she may connect the PC 140 to the image forming apparatus 131 to thereby update firmware. In the example shown in FIG. 1, although the PC 140 updates the firmware of the image forming apparatus 131 provided in the customer system 129, the PC 140 may update the firmware of any image forming apparatuses provided in the customer system.

Figure 2A:
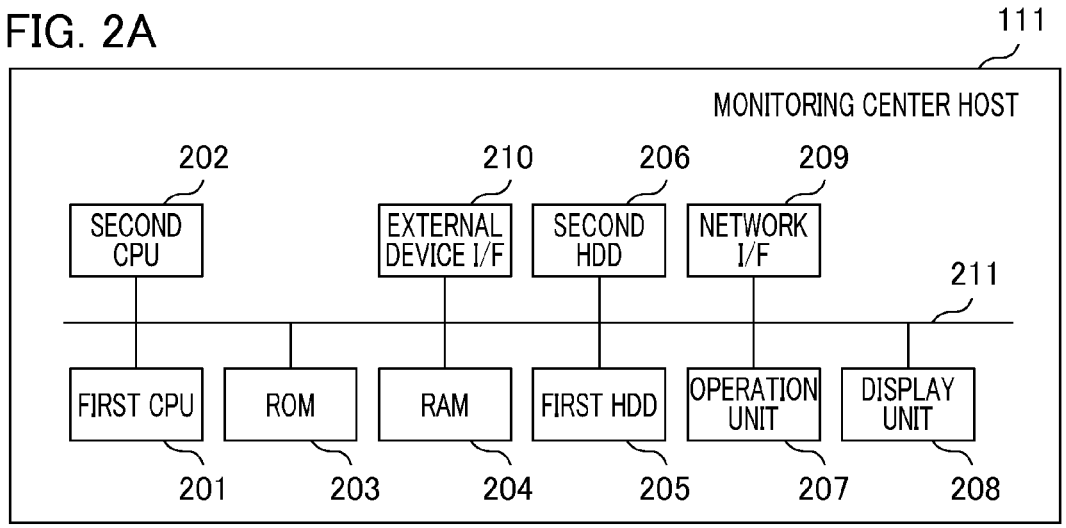
FIG. 2A is a diagram illustrating an example of the hardware configuration of a monitoring center host.
Figure 2B:
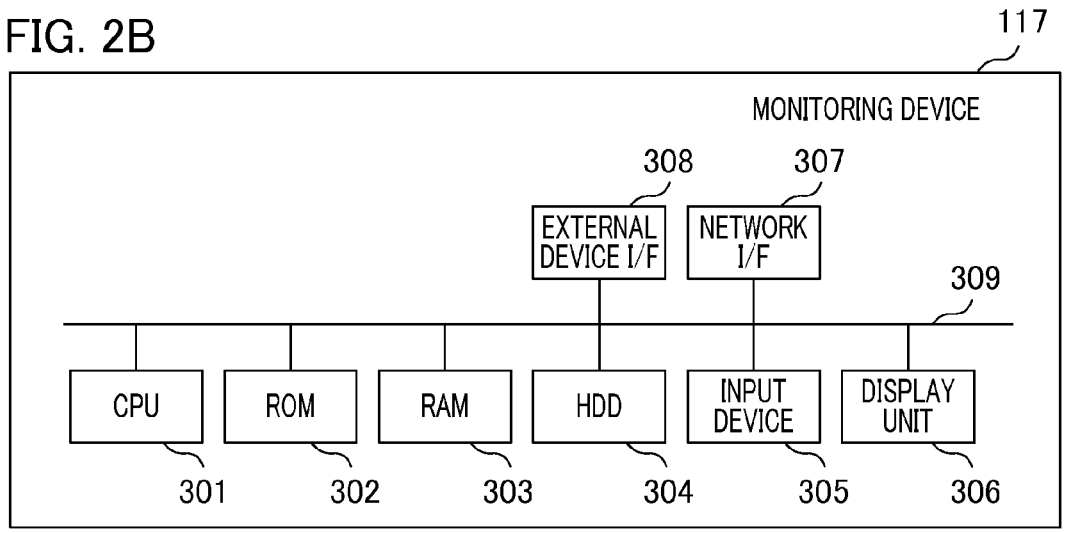
FIGS. 2B and 2C are diagrams illustrating an example of the hardware configuration of a monitoring device.
Figure 2C:
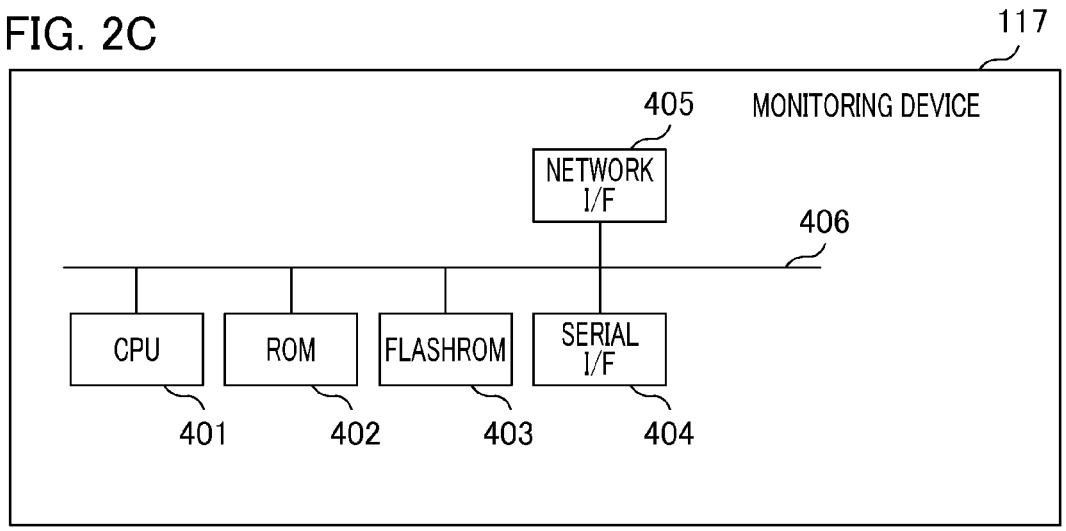

FIGS. 2A to 2C are diagrams illustrating examples of the hardware configuration of a monitoring center host and a monitoring device shown in FIG. 1. FIG. 2A is a diagram illustrating an example of the hardware configuration of the monitoring center host 111. Note that the hardware configuration of the distribution server and the host provided in the management system of the present embodiment is the same as that of the monitoring center host shown in FIG. 2A.

The monitoring center host 111 includes a first CPU 201, a second CPU 202, a ROM 203, a RAM 204, a first HDD 205, a second HDD 206, an operation unit 207, a display unit 208, and a Network I/F 209. The respective processing units are connected to each other via a system bus 211. The first CPU (Central Processing Unit) 201, and the second CPU 202 control the whole monitoring center host 111. The ROM (Read Only Memory) 203 is a non-rewritable storage unit, and stores a program and data related to each process performed by the monitoring center host 111. The RAM (Random Access Memory) 204 stores temporary data related to each process performed by the monitoring center host 111. The first HDD 205 and the second HDD 206 store a program and data related to each process executed by the monitoring center host 111, temporary data, information about the image forming apparatus to be monitored, information collected from the image forming apparatus, and the like.

HDD is an abbreviation for Hard Disk Drive. The first HDD 205 or the second HDD 206 stores, for example, a component counter, a payment counter, a division counter, and the like collected from the image forming apparatus. The operation unit 207 inputs instructions according to a user's operation. The operation unit 207 includes, for example, a keyboard and a pointing device. The display unit 208 displays the operation status of the monitoring center host 111 and information output by each program running on the monitoring center host 111. A Network I/F (Interface) 209 exchanges information with an external apparatus via the network 132. An external device I/F 210 connects an external storage device or the like.

FIG. 2B is a diagram illustrating an example of the hardware configuration of a monitoring device. In FIG. 2B, a description will be given by taking an example of the hardware configuration of the monitoring device 117. The hardware configuration of the monitoring device shown in FIG. 2B is also applicable to the hardware configurations of the PCs 104, 109, and 140. The monitoring device 117 includes a CPU 301, a ROM 302, a RAM 303, an HDD 304, an input device 305, a display unit 306, a Network I/F 307, and an external device I/F 308. The respective processing units are connected to each other via a system bus 309. The CPU 301 controls the monitoring device 117 overall. The ROM 302 stores a program and data related to processing executed by the monitoring device 117. The RAM 303 stores temporary data related to processing executed by the monitoring device 117. The HDD 304 stores a program and data related to processing executed by the monitoring device 117, temporary data, information about the image forming apparatus to be monitored, information collected from the image forming apparatus, and the like. The input device 305 inputs instructions according to a user's operation. The input device 305 includes, for example, a keyboard and a pointing device. The display unit 306 displays operation status information about the monitoring device 117 and information output by each program running on the monitoring device 117. The external device I/F 308 connects an external storage device or the like.

FIG. 2C is a diagram illustrating another example of the hardware configuration of the monitoring device. In the example shown in FIG. 2C, the monitoring device 117 includes a CPU 401, a ROM 402, a Flash ROM 403, a serial I/F 404, and a Network I/F 405. The respective processing units are connected to each other via a system bus 406. The CPU 401 and the ROM 402 have the same function as the CPU 301 and the ROM 302 shown in FIG. 2B, respectively. The Flash ROM 403 stores data and temporary data related to processing executed by the monitoring device 117, information about the image forming apparatus to be monitored, information collected from the image forming apparatus, and the like. The serial I/F 404 mediates processing for outputting error information and log to an external apparatus by the program on the monitoring device 117. The Network I/F 405 exchanges information with an external apparatus via the network 132.

Figure 3:
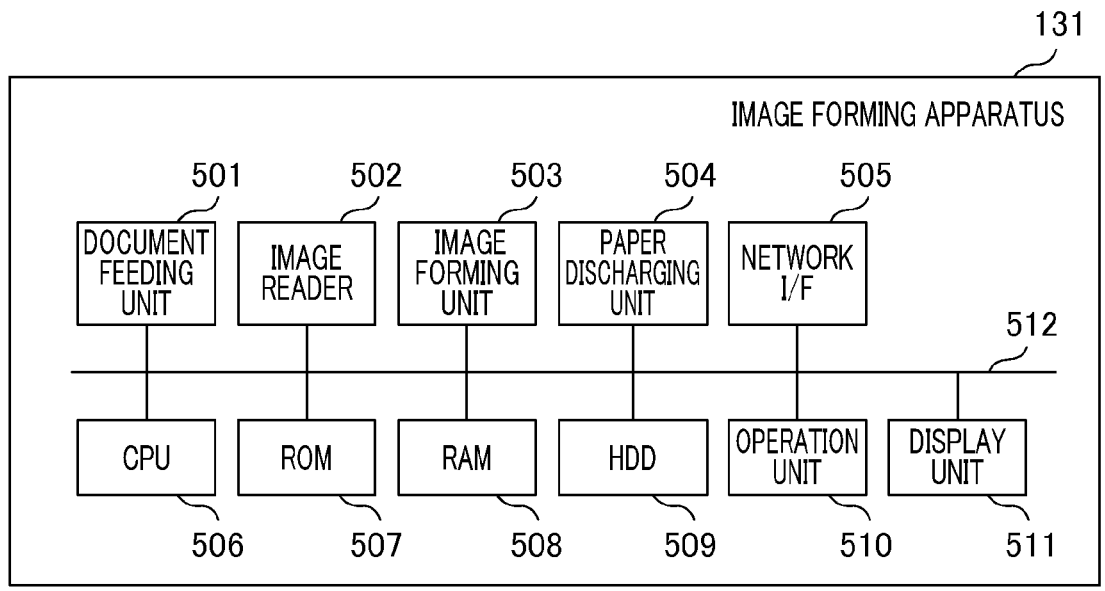
FIG. 3 is a diagram illustrating an example of the hardware configuration of an image forming apparatus.

FIG. 3 is a diagram illustrating an example of the hardware configuration of the image forming apparatus shown in FIG. 1. In FIG. 3, a description will be given by taking an example of the hardware configuration of the image forming apparatus 131. Examples of the image forming apparatus include a multifunction peripheral (MFP) integrally providing a printer function and a facsimile function, a printer that receives data from a PC and prints the received data (including an electrophotographic printer and an ink jet printer), a scanner, a facsimile, and the like. In FIG. 3, a description will be given on an exemplary case where the image forming apparatus is a multifunction peripheral. Among the image forming apparatuses shown in FIG. 1, the hardware configuration of the image forming apparatuses other than the image forming apparatus 131 is the same as that of the image forming apparatus 131.

The image forming apparatus 131 includes an document feeding unit 501, an image reader 502, an image forming unit 503, a paper discharging unit 504, a Network I/F 505, a CPU 506, a ROM 507, a RAM 508, an HDD 509, an operation unit 510, and a display unit 511. The respective processing units are connected to each other via a system bus 512. The document feeding unit 501 reads a document in accordance with the instructions given by the image reader 502. The image reader 502 provides instructions about reading a document to the document feeding unit 501. The image forming unit 503 converts the read document and data received via the network 132 into a print image and prints out the image. The paper discharging unit 504 discharges a paper having the printed image thereon and performs sorting processing and stapling processing. The Network I/F 505 exchanges information with an external apparatus via a LAN 130 and the network 132.

The CPU 506 controls the image forming apparatus 131 overall. The CPU 506 monitors the operation status of the image forming apparatus 131. If a specific event such as a fault or the like has occurred, the CPU 506 transmits status information indicating the fault or the like to a predetermined transmission destination. The transmission destination includes the monitoring center host 111, the monitoring device, or the like. The ROM 507 stores a program and data related to processing executed by the image forming apparatus 131. The RAM 508 stores temporary data related to processing executed by the image forming apparatus 131. The HDD 509 stores a program and data related to processing executed by the image forming apparatus 131, temporary data, user data transmitted to the image forming apparatus 131, and the like. Note that a program, by which the image forming apparatus 131 realizes a function of transmitting information indicating the operation state of the image forming apparatus 131 directly to the monitoring center host, is stored in the ROM 507 or the HDD 509 in advance. The operation unit 510 inputs instructions according to a user's operation. The display unit 511 displays the operation status of the image forming apparatus 131 and information about a user's operation.

Figure 4:
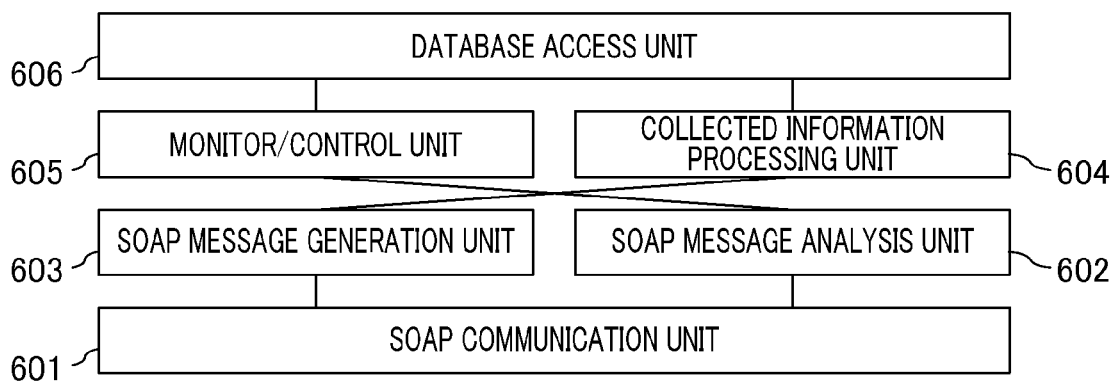
FIG. 4 is a functional block diagram illustrating an example of a monitoring center host.

FIG. 4 is a functional block diagram illustrating an example of a monitoring center host. Note that the functional block diagram of the distribution server 133 is the same as that of the monitoring center host 111 shown in FIG. 4. The monitoring center host 111 includes a SOAP communication unit 601, a SOAP message analysis unit 602, a SOAP message generation unit 603, a collected information processing unit 604, a monitor/control unit 605, and a database access unit 606. The SOAP communication unit 601 receives SOAP data from the monitoring device or the image forming apparatus via the Network I/F 209, and then transfers the received SOAP data to the SOAP message analysis unit 602. Also, the SOAP communication unit 601 transmits SOAP data generated by the SOAP message generation unit 603 to the monitoring device or the image forming apparatus via the Network I/F 209. The SOAP message analysis unit 602 analyzes a SOAP message. The SOAP message generation unit 603 generates a SOAP message in accordance with the instructions given by the collected information processing unit 604 and the monitor/control unit 605.

The collected information processing unit 604 acquires information transmitted from the monitoring device, the image forming apparatus 131, or the distribution server 133 based on the analysis result of the SOAP message by the SOAP message analysis unit 602. The collected information processing unit 604 stores the acquired information in the database 112 via the database access unit 606. Note that in the distribution server 133, the collected information processing unit 604 stores the acquired information in the database 134.

Also, the collected information processing unit 604 executes various processes for information stored in the database 112. For example, based on information stored in the database 112, an aggregation of counter information for the image forming apparatus, error information, or the latest information about firmware corresponding to the image forming apparatus is generated, and the generated information is then reported to a service person in charge or a customer-side administrator. For this purpose, the collected information processing unit 604 provides instructions about generating a SOAP message to the SOAP message generation unit 603. The monitor/control unit 605 manages the schedule for acquiring information to the monitoring device or the image forming apparatus, or performs control related to the monitoring settings of the image forming apparatus. Also, the monitor/control unit 605 provides instructions about distributing firmware to the image forming apparatus for the distribution server 133 in accordance with the firmware download instruction received from the PC 104. For this purpose, the monitor/control unit 605 provides instructions about generating a SOAP message to the SOAP message generation unit 603.

Figure 5A:
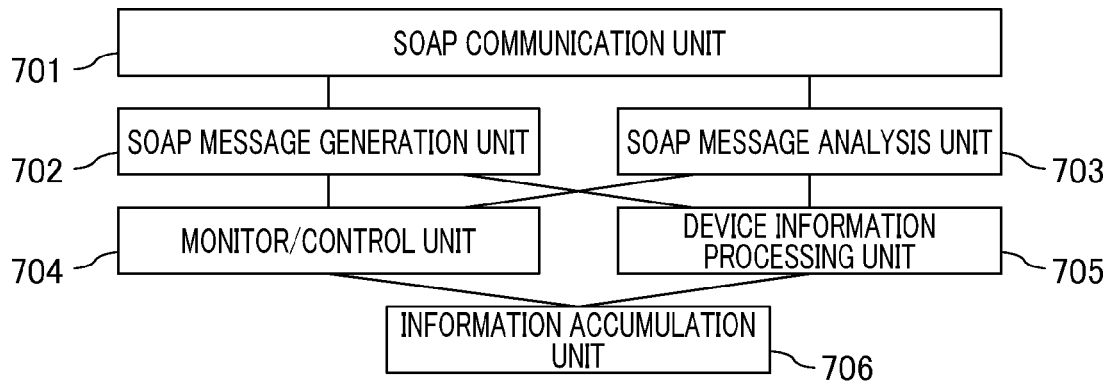
FIG. 5A is a functional block diagram illustrating an example of a monitoring device.
Figure 5B:
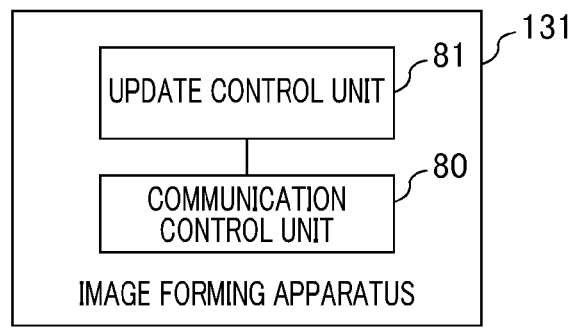
FIGS. 5B and 5C are functional block diagrams illustrating an example of an image forming apparatus.
Figure 5C:
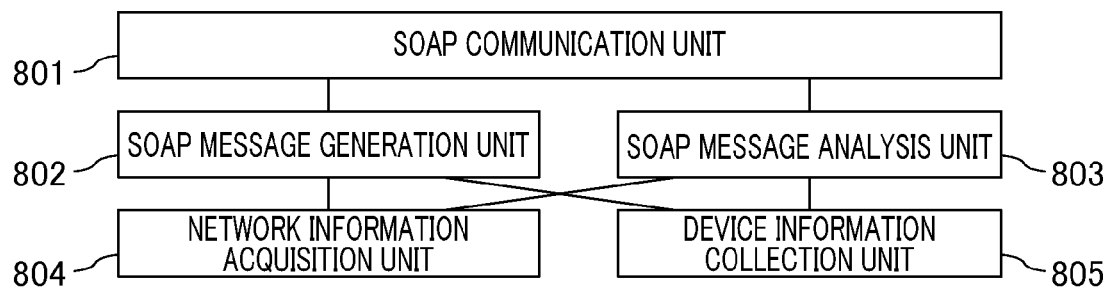

FIGS. 5A to 5C are functional block diagrams illustrating examples of a monitoring device and an image forming apparatus. FIG. 5A is an exemplary functional block diagram illustrating the monitoring device 117. The monitoring device 117 includes a SOAP communication unit 701, a SOAP message generation unit 702, a SOAP message analysis unit 703, a monitor/control unit 704, a device information processing unit 705, and an information accumulation unit 706. The SOAP communication unit 701 receives a SOAP message from the monitoring center host 111 via the network 132, and then transfers the received SOAP message to the SOAP message analysis unit 703. Also, the SOAP communication unit 701 transmits the SOAP message generated by the SOAP message generation unit 702 to the monitoring center host 111 and the distribution server 133. The SOAP message generation unit 702 generates a SOAP message in accordance with the instructions given by the device information processing unit 705 and the monitor/control unit 704. The SOAP message analysis unit 703 analyzes the SOAP message.

The monitor/control unit 704 performs processing matched to the monitoring settings of the image forming apparatus by the monitoring center host 111. More specifically, the monitor/control unit 704 stores information about the image forming apparatus to be monitored in the information accumulation unit 706 and updates it. Also, the monitor/ control unit 704 stores information acquired from the image forming apparatus to be monitored in the information accumulation unit 706. Furthermore, the monitor/control unit 704 performs processing for transmitting information about the image forming apparatus, which has been stored in the information accumulation unit 706, to the monitoring center host 111. In addition, the monitor/control unit 704 performs processing for transmitting information about the image forming apparatus, which has been stored in the information accumulation unit 706, to the monitoring center host 111. For this purpose, the monitor/control unit 704 provides instructions about generating a SOAP message to the SOAP message generation unit 702.

The device information processing unit 705 acquires information indicating the operation state of the image forming apparatus from the image forming apparatus in accordance with the schedule management performed by the monitor/control unit 704, and stores the acquired information in the information accumulation unit 706. Also, the device information processing unit 705 performs control for transmitting the SOAP message including information stored in the information accumulation unit 706 to the monitoring center host 111 via the SOAP communication unit 701. For this purpose, the device information processing unit 705 provides instructions about generating a SOAP message to the SOAP message generation unit 702.

FIG. 5B is a functional block diagram illustrating an example of an image forming apparatus. The functional block diagram shown in FIG. 5B shows the processing units having functions related to firmware download and firmware application among the functions of the image forming apparatus 131 shown in FIG. 1. Among the image forming apparatuses shown in FIG. 1, the functional block diagram of the image forming apparatuses other than the image forming apparatus 131 is the same as that of the image forming apparatus 131. The image forming apparatus 131 includes a communication control unit 80 and an update control unit 81. The communication control unit 80 controls communication between the image forming apparatus 131 and an external apparatus. The update control unit 81 performs control related to downloading firmware to the image forming apparatus 131. The update control unit 81 provides instructions to, for example, the communication control unit 80, and causes the communication control unit 80 to generate a SOAP message, which includes a firmware distribution reservation, to the image forming apparatus 131. Also, the update control unit 81 performs control related to updating firmware to the image forming apparatus 131. The update control unit 81 updates firmware applied to the image forming apparatus 131 in accordance with the instructions given by, for example, the PC 140 (see FIG. 1).

FIG. 5C is an exemplary functional block diagram illustrating the communication control unit 80 shown in FIG. 5B. FIG. 5C shows the processing units that realize the functions related to communication with SOAP among the processing units provided in the communication control unit 80. The communication control unit 80 includes a SOAP communication unit 801, a SOAP message generation unit 802, a SOAP message analysis unit 803, a network information acquisition unit 804, and a device information collection unit 805. The SOAP communication unit 801 receives a SOAP message from the monitoring center host 111 and the distribution server 133 via a network 302. The SOAP communication unit 801 transfers the received SOAP message to the SOAP message analysis unit 803. Also, the SOAP communication unit 801 transmits the SOAP message generated by the SOAP message generation unit 802 to the monitoring center host 111 and the distribution server 133. The SOAP message generation unit 802 generates a SOAP message in accordance with the instructions given by the network information acquisition unit 804, the device information processing unit 805, or the update control unit 81 shown in FIG. 5B. For example, the SOAP message generation unit 702 generates a SOAP message including a firmware distribution reservation to the image forming apparatus 131. The SOAP message analysis unit 803 analyzes a SOAP message, and transfers the analysis result to the network information acquisition unit 804 and the update control unit 81.

The network information acquisition unit 804 automatically acquires an IP (Internet Protocol) address, a DNS server, and a gateway address in the DHCP environment. DHCP is an abbreviation for Dynamic Host Configuration Protocol. DNS is an abbreviation for Domain Name Server. The network information acquisition unit 804 may acquire network information stored in the HDD 509 (see FIG. 3). The device information collection unit 805 acquires information indicating the operation state of the image forming apparatus 131 and counter information in accordance with the schedule followed inside the image forming apparatus 131 or the instructions given by the monitoring center host 111. The device information collection unit 805 provides instructions to the SOAP message generation unit 802 about generating a SOAP message including the acquired these information.

Figure 6:
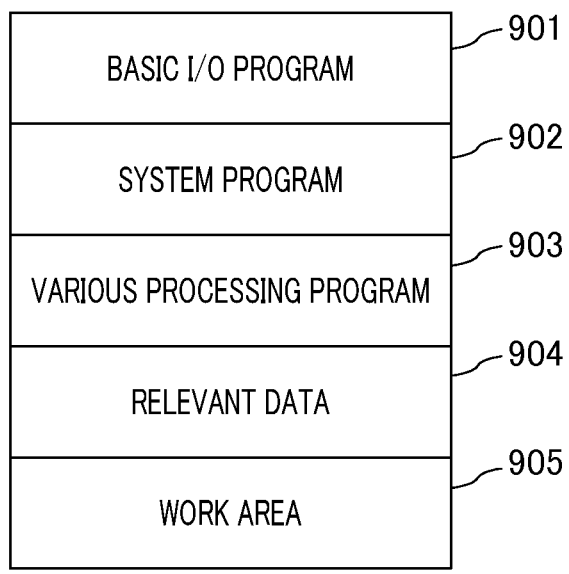
FIG. 6 is a diagram illustrating the structure of a memory map employed in a monitoring center host, a distribution server, a monitoring device, and an image forming apparatus.

FIG. 6 is a diagram illustrating the structure of a memory map employed in a monitoring center host, a distribution server, a monitoring device, and an image forming apparatus. The monitoring center host 111 and the distribution server 133 load a program related to the present embodiment to the RAM 204 (see FIG. 2A), and then executes the loaded program. The respective monitoring devices load a program related to the present embodiment to the RAM 303 (see FIG. 2B) or the Flash ROM 403 (see FIG. 2C), and then executes the loaded program. Also, the respective image forming apparatuses load a program related to the present embodiment to the RAM 508 (see FIG. 3), and then executes the loaded program. The memory map shown in FIG. 6 is a memory map in the state where the monitoring center host, the distribution server, the monitoring device, and the image forming apparatus have loaded a program to the RAM or the Flash ROM described above. The memory map shown in FIG. 6 is constituted by a basic I/O (Input Output) program 901, a system program 902, a various processing program 903, an area 904 for storing relevant data, and a work area 905 for a program. The basic I/O program 901 controls an input and an output to and from the image forming apparatuses. The system program 902 provides an operation environment for various processing programs. The various processing programs are programs that execute the processing of the present embodiment.

Figure 7:
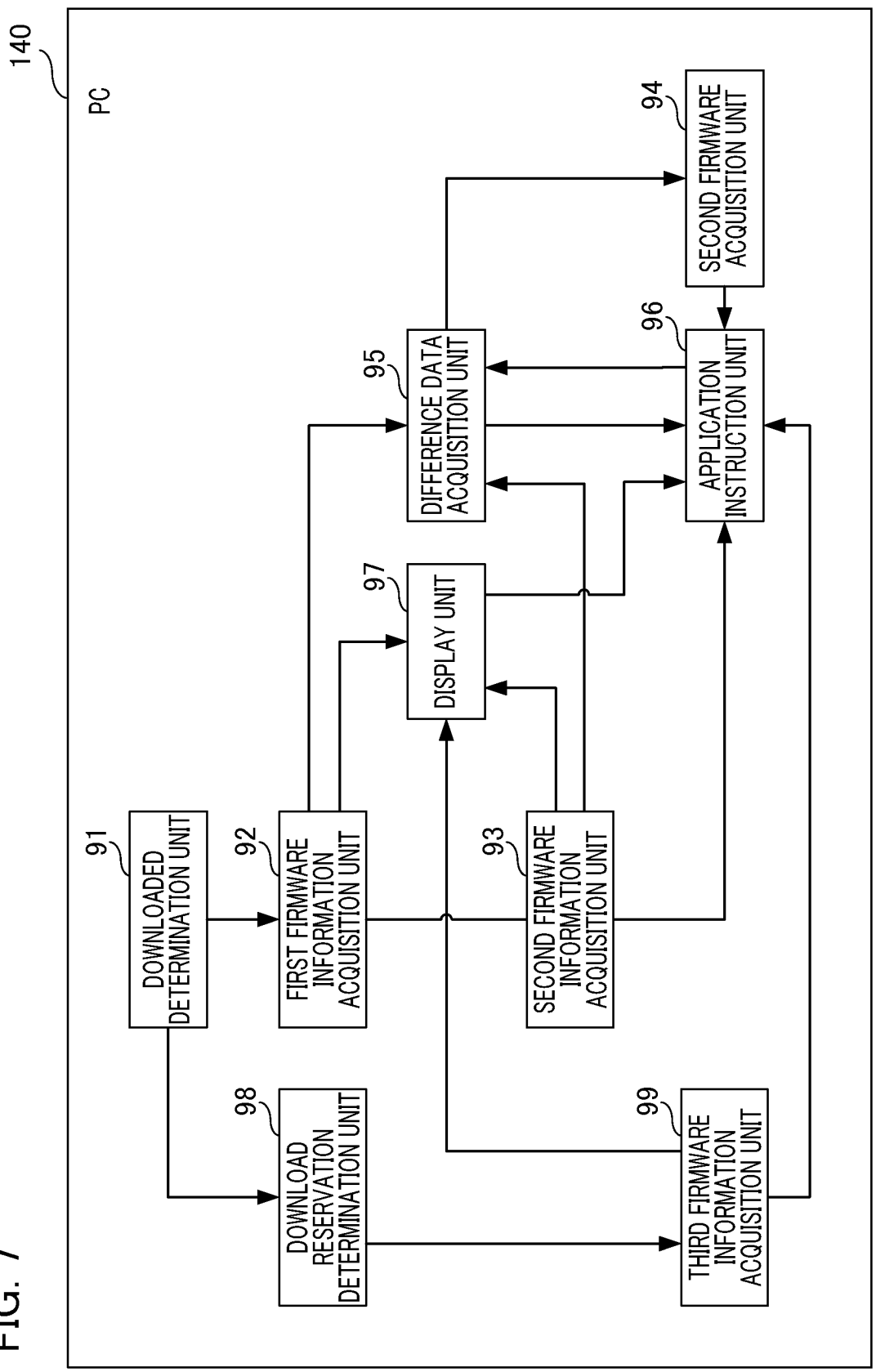
FIG. 7 is a functional block diagram illustrating an example of an information processing apparatus of the present embodiment.

FIG. 7 is a functional block diagram illustrating an example of an information processing apparatus of the present embodiment. More specifically, FIG. 7 shows the functional block diagram of the PC 140 shown in FIG. 1. The PC 140 includes a downloaded determination unit 91, a first firmware information acquisition unit 92, a second firmware information acquisition unit 93, a second firmware acquisition unit 94, a difference data acquisition unit 95, and an application instruction unit 96. The PC 140 further includes a display unit 97, a download reservation determination unit 98, and a third firmware information acquisition unit 99.

The downloaded determination unit 91 determines whether or not there is firmware that has been downloaded to the image forming apparatus 131 connected to the PC 140. When the downloaded determination unit 91 determines that there is firmware that has been downloaded to the image forming apparatus 131, the first firmware information acquisition unit 92 performs the following processing. The first firmware information acquisition unit 92 acquires information about a first firmware, i.e., the downloaded firmware, from the image forming apparatus 131 as first firmware information. First firmware information includes at least version information and firmware package information about first firmware. Version information is information about the version of the first firmware. Firmware package information is information about the package, i.e., a plurality of data constituting the corresponding firmware. Firmware package information includes an ID for uniquely identifying the package and version information about the package. Hereinafter, first firmware information is also referred to as "downloaded firmware information".

The second firmware information acquisition unit 93 acquires information about a predetermined second firmware that matches the image forming apparatus 131 as second firmware information. Second firmware information includes at least version information and firmware package information about a second firmware. Hereinafter, the second firmware is also referred to as "target firmware". In addition, second firmware information is also referred to as "target firmware information".

The second firmware acquisition unit 94 acquires the second firmware pre-stored in a predetermined storage unit in the PC 140. The second firmware is firmware that matches the image forming apparatus 131. The difference data acquisition unit 95 functions as a difference data acquisition unit configured to acquire difference data when the application of the second firmware to an image forming apparatus 133 is selected from the first firmware and second firmware. Difference data is data corresponding to the difference between the first firmware and second firmware. Difference data is, for example, a difference package. The difference data acquisition unit 95 compares first firmware information with second firmware information, and acquires difference data based on the comparison result between first firmware information and second firmware information. More specifically, the difference data acquisition unit 95 compares version information about the package included in the first firmware with version information about the package included in the second firmware, and acquires difference data based on the comparison result.

The application instruction unit 96 functions as an application instruction unit configured to apply difference data and the first firmware to the image forming apparatus 133. The image forming apparatus 133 applies difference data and the first firmware, whereby the updated firmware (second firmware) is applied to the image forming apparatus 133. Also, when the application of the second firmware to the image forming apparatus 133 is selected from the second firmware and third firmware, the application instruction unit 96 executes the following processing. A third firmware is firmware of which the distribution reservation, i.e., downloading reservation, has already been made to the image forming apparatus 133. Based on second firmware information and third firmware information, the application instruction unit 96 determines whether or not the second firmware is applicable to the image forming apparatus 133 only after the third firmware has been downloaded and applied to the image forming apparatus 133. When the application instruction unit 96 determines that the second firmware is applicable to the image forming apparatus 133 only after the third firmware has been downloaded and applied to the image forming apparatus 133, the application instruction unit 96 executes the following processing. The application instruction unit 96 provides instructions to the image forming apparatus 133 about applying the second firmware after the third firmware has been downloaded and applied to the image forming apparatus 133.

The display unit 97 displays a UI related to the application of firmware to the image forming apparatus 133 on a screen. The download reservation determination unit 98 functions as a download reservation determination unit when the downloaded determination unit 91 determines that the downloaded firmware is absent on the image forming apparatus 133. More specifically, the download reservation determination unit 98 determines whether or not a reservation for downloading the third firmware to the image forming apparatus 133 has been made. When the download reservation determination unit 98 determines that a reservation for downloading third firmware to the image forming apparatus 133 has been made, the third firmware information acquisition unit 99 performs the following processing. The third firmware information acquisition unit 99 functions as a third firmware information acquisition unit configured to acquire information about the third firmware as third firmware information. The firmware application method and the computer program of the present embodiment are realized by the functions of the processing units provided in the PC 140 shown in FIG. 7.

Figure 8:
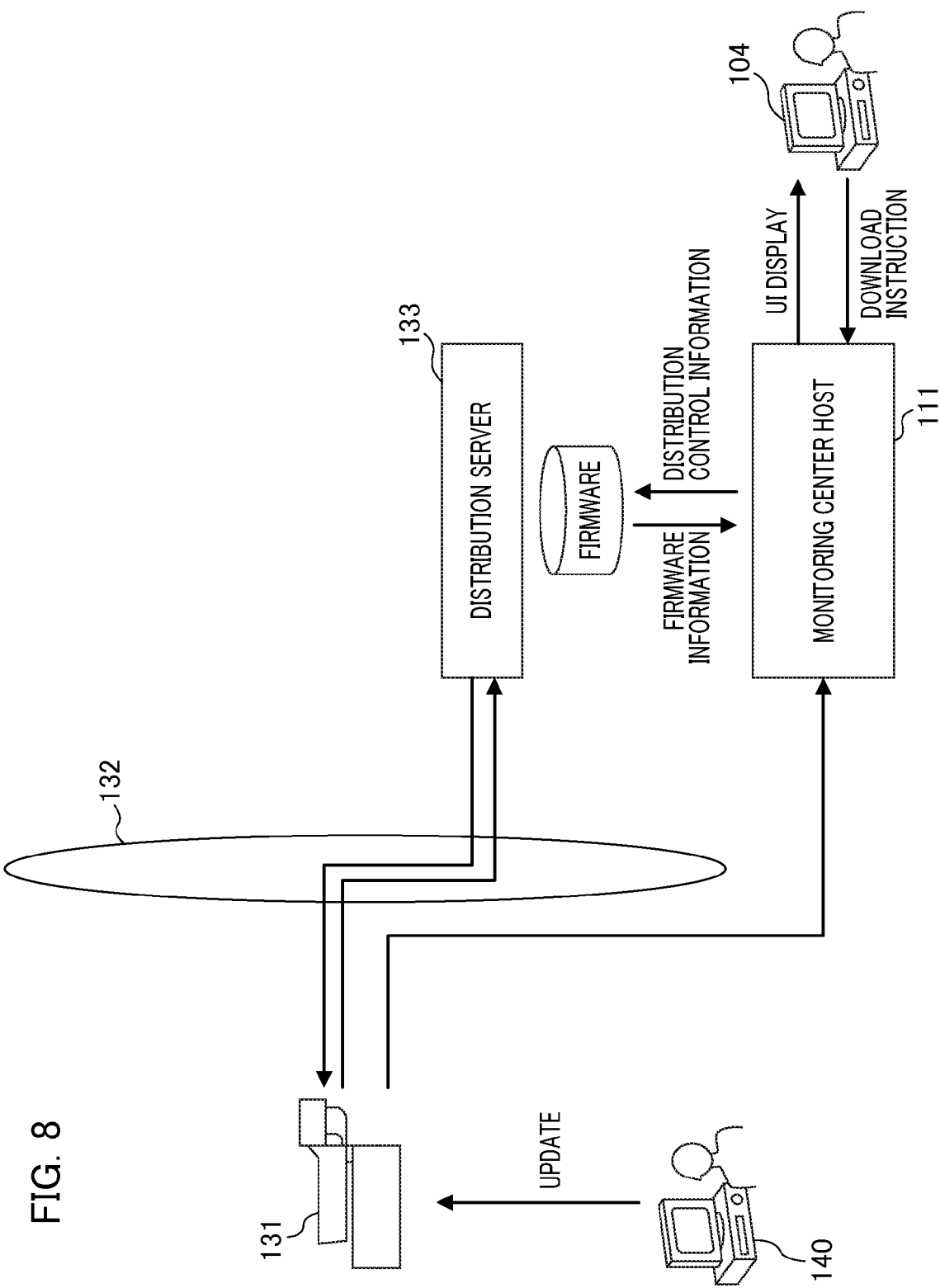
FIG. 8 is a diagram illustrating overall operation processing performed by a firmware management system.

FIG. 8 is a diagram illustrating the overall operation processing performed by a firmware management system of the present embodiment. The monitoring center host 111 acquires and manages information indicating the operation state of the image forming apparatus 131 via the network 132. Also, the monitoring center host 111 receives information about firmware that is being distributed to the image forming apparatus 133 and information (firmware information) about firmware that can be distributed to the image forming apparatus from the distribution server 133. The monitoring center host 111 provides firmware information on the Web site, and provides an UI to the PC 104 that accesses the Web site. When a user of the PC 104 provides a download instruction using the UI provided from the monitoring center host 111, the monitoring center host 111 transmits distribution control information to the distribution server 133, and causes it to distribute firmware to the image forming apparatus 133. Distribution control information is control information relating to distribution of firmware to the image forming apparatus 133. On the other hand, the image forming apparatus 133 makes a firmware distribution reservation to the distribution server 133 via the network 132. The distribution server 133 receives a firmware distribution reservation from the image forming apparatus 131 via the network 132, and distributes the distribution-reserved firmware to the image forming apparatus 131.

Figure 9:
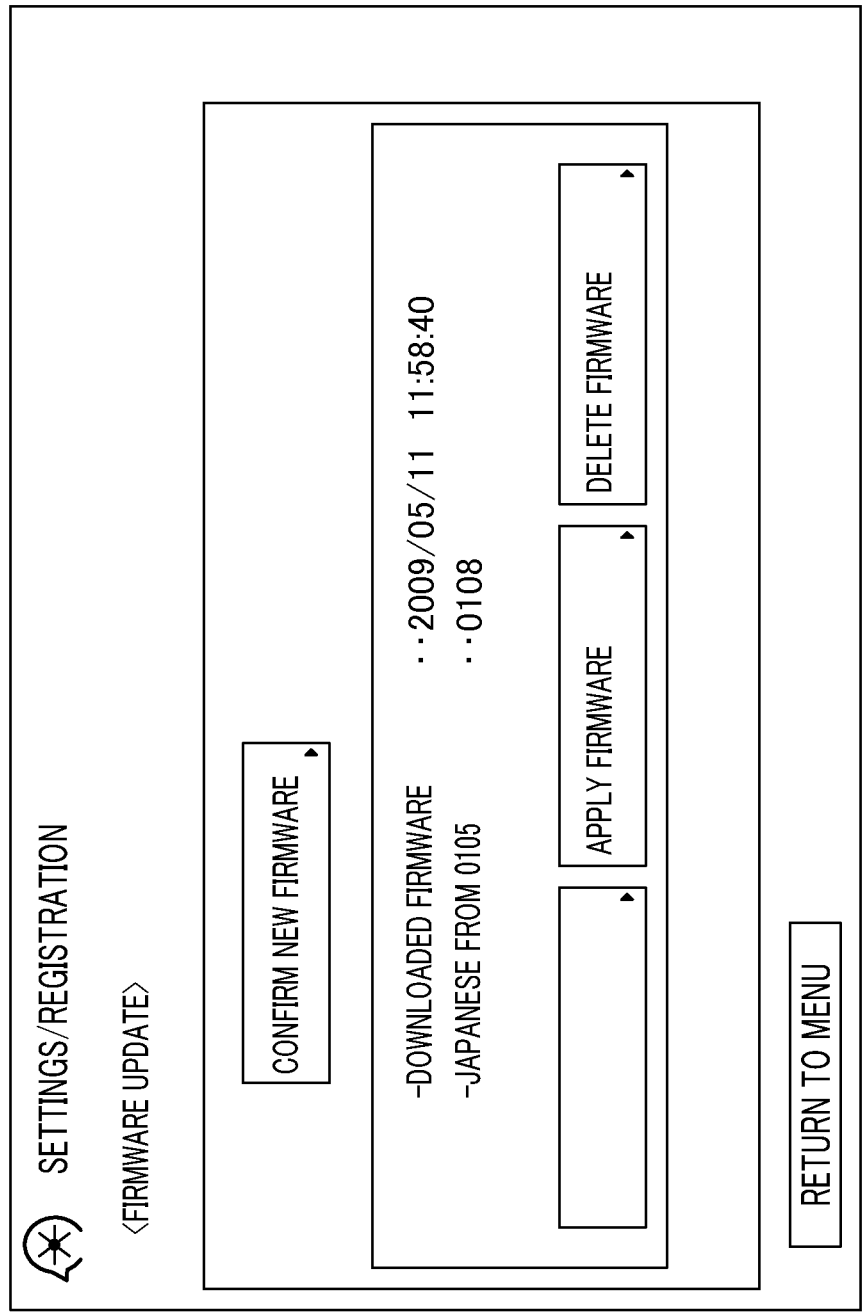
FIG. 9 is a diagram illustrating an example of an UI displayed by an image forming apparatus.

FIG. 9 is a diagram illustrating an example of a UI displayed by an image forming apparatus. When firmware has been downloaded to the image forming apparatus 131, the image forming apparatus 131 displays an UI as shown in FIG. 9 on a screen. Information about the firmware that has been downloaded to the image forming apparatus 131, the date at which the firmware has been downloaded, the version of firmware, and the like are displayed on the UI. A user's operation performed using the UI enables the image forming apparatus to apply/delete the firmware.

Here, as described with reference to FIG. 8, there is a case in which firmware, which has already been applied or downloaded to the image forming apparatus 131, needs to be updated in the state where firmware distribution processing is being carried out to the image forming apparatus 131. In this case, the PC 140 connected to the image forming apparatus 131 updates firmware that has already been applied or downloaded to the image forming apparatus 131.

Figure 10:
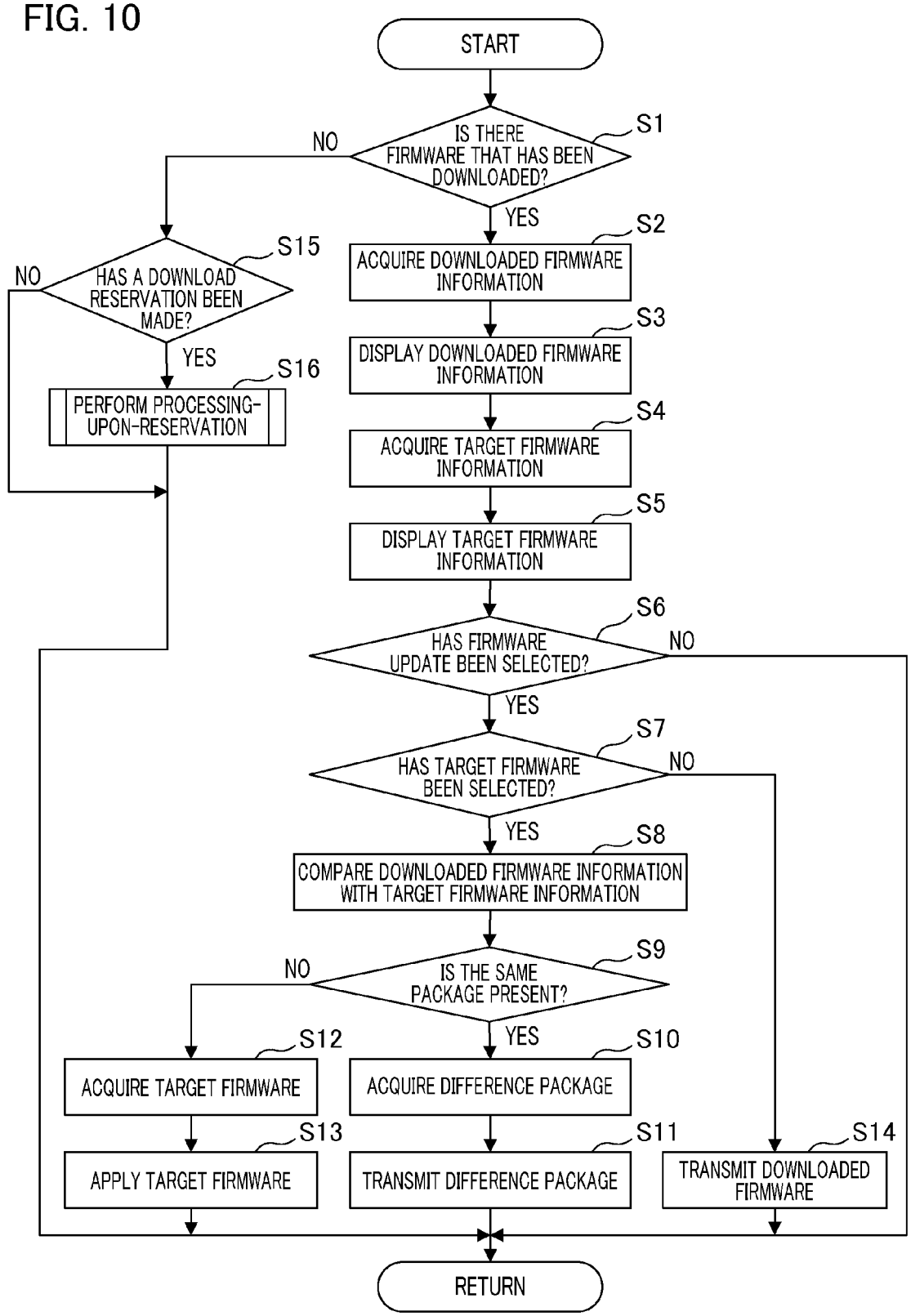
FIG. 10 is a flowchart illustrating firmware update processing performed by an image forming apparatus.

FIG. 10 is a flowchart illustrating firmware update processing performed by an image forming apparatus. First, the downloaded determination unit 91 in the PC 140 determines whether or not there is firmware that has been downloaded to the image forming apparatus 131 (step S1). In step S1, the downloaded determination unit 91 transmits a confirmation command for confirming whether or not the downloaded firmware is present to the update control unit 81 provided in the image forming apparatus 131. The downloaded determination unit 91 determines whether or not there is firmware that has been downloaded to the image forming apparatus 131 based on the response from the update control unit 81 of the image forming apparatus 131 that has received the confirmation command.

When the downloaded determination unit 91 determines that there is firmware that has been downloaded to the image forming apparatus 131, the first firmware information acquisition unit 92 executes the following processing. More specifically, the first firmware information acquisition unit 92 acquires downloaded firmware information from the update control unit 81 of the image forming apparatus 131 (step S2). Downloaded firmware information includes, for example, the downloaded date, label information, firmware version information, and firmware package information. Next, the display unit 97 displays the downloaded firmware information acquired in step S2 (step S3). More specifically, the display unit 97 displays the screen shown in FIG. 11. A display area 1501 on the screen shown in FIG. 11 displays [JAPANESE_FROM_0105] and [0108] as label information and version information corresponding to the downloaded firmware, respectively.

Next, the second firmware information acquisition unit 93 acquires target firmware information pre-stored in a storage unit (step S4). Then, the display unit 97 displays the target firmware information acquired in step S4 (step S5). With this arrangement, for example, a display area 1502 on the screen shown in FIG. 11 displays [JAPANESE_FROM_0105] and [0109] as label information and version information corresponding to target firmware, respectively. When a user selects information corresponding to the displayed target firmware and performs a press operation of a button (update start button) described as "start update", the application of target firmware to the image forming apparatus 131 is selected. On the other hand, when a user selects information corresponding to the displayed downloaded firmware and performs a press operation of the update start button, the application of the downloaded firmware to the image forming apparatus 131 is selected.

Next, the application instruction unit 96 determines whether or not the update of firmware has been selected, that is, whether or not the press operation of the update start button has been performed (step S6). When the application instruction unit 96 determines that the update of firmware has been selected, the application instruction unit 96 determines whether or not the application of target firmware to the image forming apparatus 131 has been selected (step S7).

When the application instruction unit 96 determines that the application of target firmware to the image forming apparatus 131 has been selected, the difference data acquisition unit 95 compares downloaded firmware information with target firmware information (step S8). Next, the difference data acquisition unit 95 compares version information about the package included in downloaded firmware information with version information about the package included in target firmware information, and then performs the following processing. The difference data acquisition unit 95 determines whether or not the same package as that included in the downloaded firmware is included in target firmware (step S9).

When the difference data acquisition unit 95 determines that the same package as that included in the downloaded firmware is not included in the target firmware, the difference data acquisition unit 95 acquires the difference package (step S10). The difference package in this example is a package that is included in target firmware but not included in the downloaded firmware. Then, the application instruction unit 96 transmits the difference package to the update control unit 131 provided in the image forming apparatus 133, and provides instructions to the update control unit 131 about applying the difference package and the downloaded firmware (step S11). In accordance with the instructions, the update control unit 131 applies the difference package and the downloaded package to the image forming apparatus 133. With this arrangement, the updated firmware (target firmware) is applied to the image forming apparatus 133.

In step S7, when the application instruction unit 96 determines that the application of target firmware to the image forming apparatus 131 has not been selected and the application of the downloaded firmware to the image forming apparatus 131 has been selected, the application instruction unit 96 performs the following processing. The application instruction unit 96 provides instructions to the update control unit 131 provided in the image forming apparatus 131 about applying the downloaded firmware (step S14). In accordance with the instructions, the update control unit 131 provided in the image forming apparatus 133 applies the downloaded firmware to the image forming apparatus 133.

In step S9, the difference data acquisition unit 95 determines that the same package as that included in the downloaded firmware is not included in target firmware, the second firmware acquisition unit 94 executes the following processing. The second firmware acquisition unit 94 acquires target firmware (step S12). Next, the application instruction unit 96 transmits target firmware to the update control unit 131 provided in the image forming apparatus 133, and provides instructions to the update control unit 131 about applying target firmware (step S13).

Note that the application instruction unit 96 may perform the following processing after the process in step S7. The application instruction unit 96 extracts version information about the downloaded firmware included in the downloaded firmware information and version information about the target firmware included in the target firmware information. Then, based on the extracted version information, the application instruction unit 96 determines whether or not the target firmware targets firmware, which has been updated by applying the downloaded firmware, for updating. When the application instruction unit 96 determines that the target firmware does not target firmware, which has been updated by applying the downloaded firmware, for updating, the process advances to step S8. On the other hand, when the application instruction unit 96 determines that the target firmware targets firmware, which has been updated by applying the downloaded firmware, for updating, the application instruction unit 96 performs the following processing. More specifically, the application instruction unit 96 transmits the target firmware to the update control unit 131 provided in the image forming apparatus 133 and provides instructions to the update control unit 131 about applying the target firmware after the downloaded firmware has been applied to the image forming apparatus 133. In accordance with the instructions, the update control unit 131 provided in the image forming apparatus 133 applies the target firmware after the downloaded firmware has been applied to the image forming apparatus 133.

In step S1, when the downloaded determination unit 91 determines that there is no firmware that has been downloaded to the image forming apparatus 131, the download reservation determination unit 98 determines whether or not a download reservation has been made (step S15). The download reservation is a reservation for downloading firmware to the image forming apparatus 133. When the download reservation determination unit 98 determines that a download reservation has not been made, the process is ended. On the other hand, when the download reservation determination unit 98 determines that a download reservation has been made, processing-upon-reservation is executed (step S16). Processing-upon-reservation is processing to be executed when a reservation for downloading firmware to the image forming apparatus 133 has been made.

Figure 11:
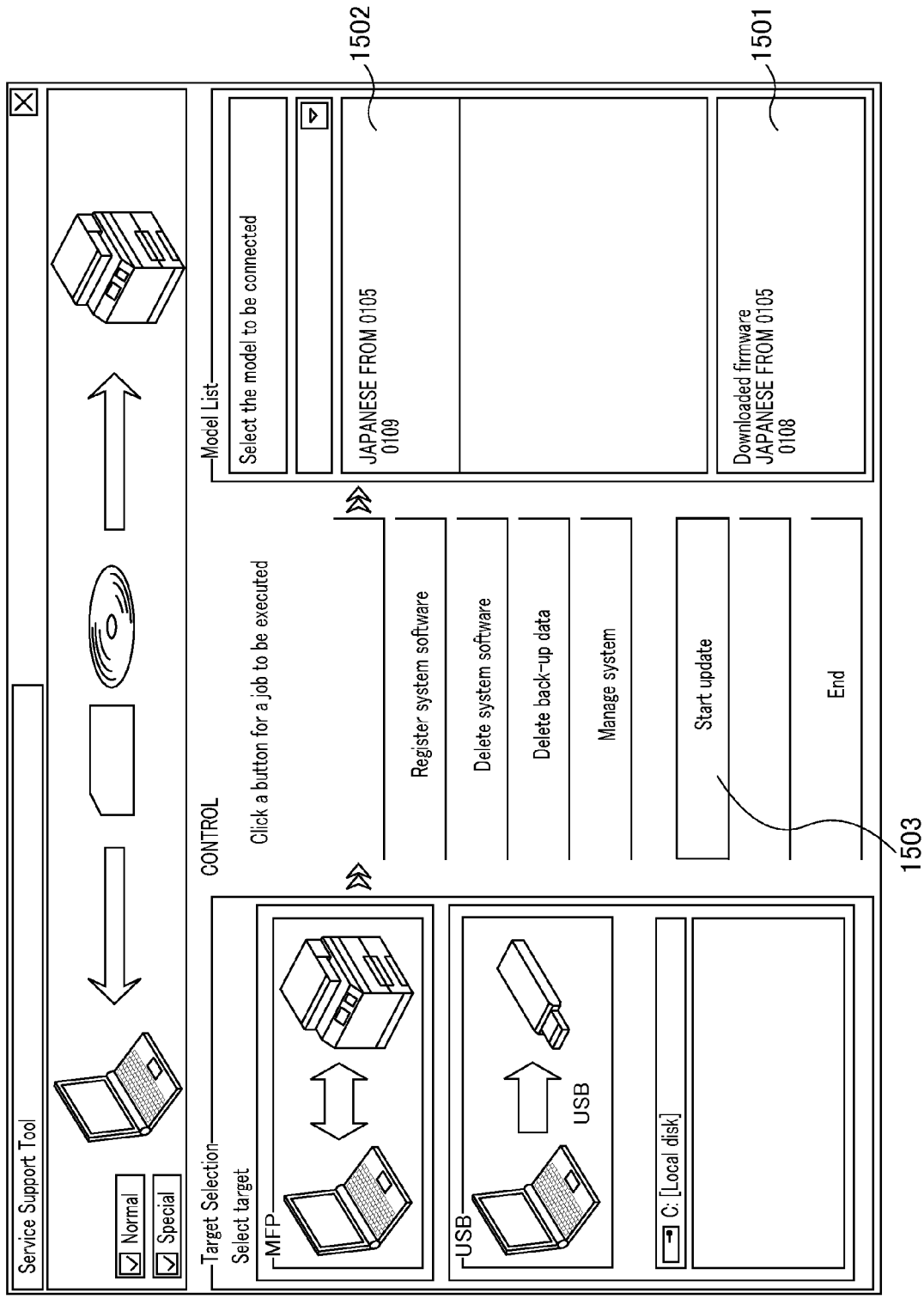
FIG. 11 is a diagram illustrating a screen displayed by a display unit.
Figure 12:
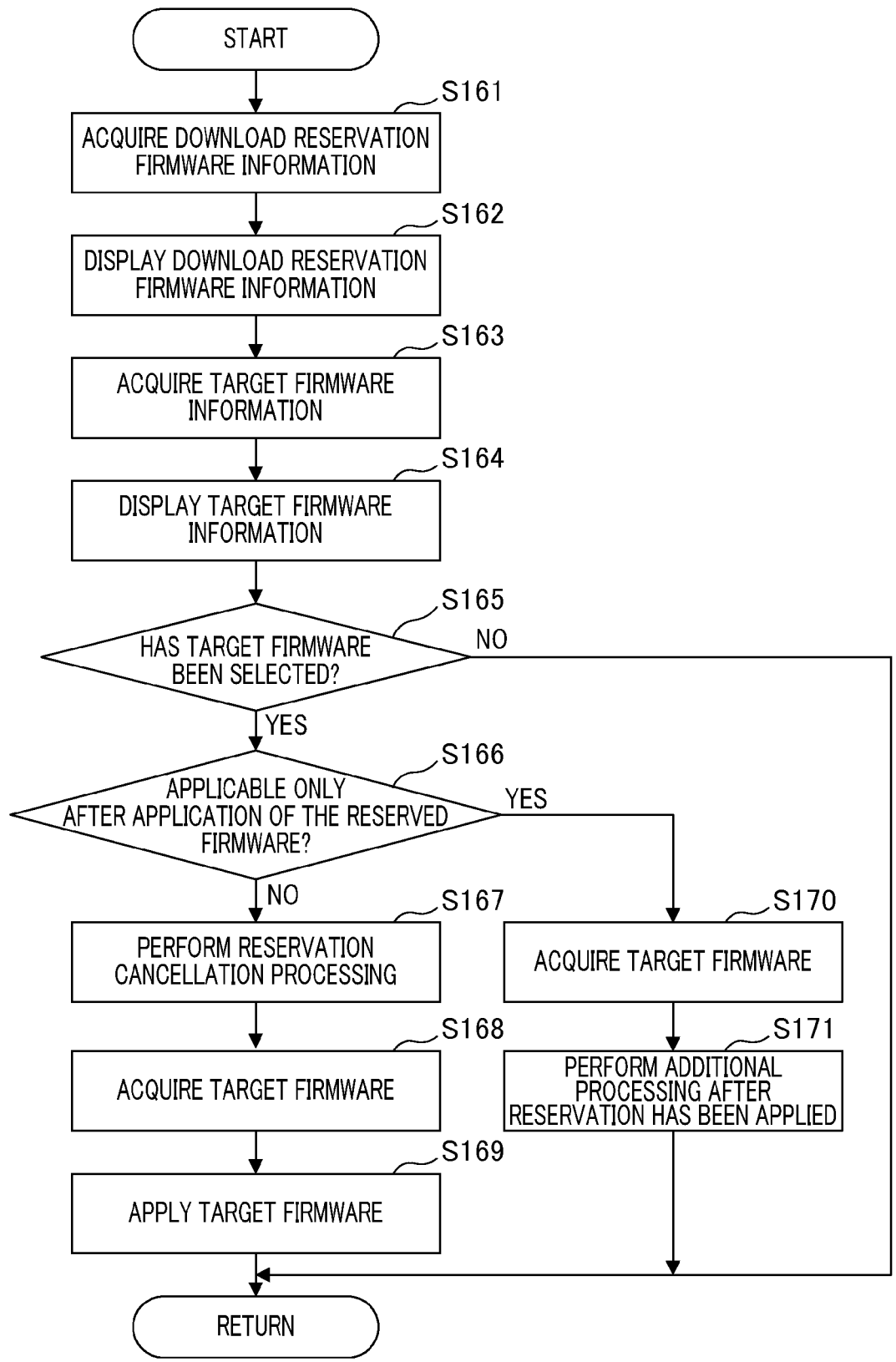
FIG. 12 is a flowchart illustrating processing upon reservation.

FIG. 12 is a flowchart illustrating processing-upon-reservation performed in step S16 in FIG. 10. First, the third firmware information acquisition unit 99 acquires download reservation firmware information, i.e., information about firmware for which the download reservation has been made, from the update control unit 81 provided in the image forming apparatus 133 (step S161). Download reservation firmware information includes the date at which the download reservation for firmware has been made, label information and version information about firmware for which the download reservation has been made, and the like. Next, the display unit 97 displays the download reservation firmware information acquired in step S161 on the same screen as that shown in FIG. 11 (step S162). Also, the second firmware information acquisition unit 93 acquires target firmware information, and the display unit 97 displays the acquired target firmware information on the screen on which the download reservation firmware information is being displayed. (step S164). When a user selects the download reservation firmware information displayed on the screen and performs a press operation of an update start button (FIG. 11), the application of the firmware, for which the download reservation has been made, to the image forming apparatus 131 is selected. For example, when a user selects the target firmware information displayed on the screen and performs a press operation of an update start button, the application of target firmware to the image forming apparatus 131 is selected.

Next, the application instruction unit 96 determines whether or not the application of target firmware to the image forming apparatus 131 has been selected (step S165). When the application instruction unit 96 determines that the application of target firmware to the image forming apparatus 131 has not been selected, the process is ended. On the other hand, when the application instruction unit 96 determines that the application of target firmware to the image forming apparatus 131 has been selected, the application instruction unit 96 performs the following processing based on download reservation firmware information and target firmware information. The application instruction unit 96 extracts version information about the firmware for which the download reservation has been made from the download reservation firmware information, and extracts version information about the target firmware from the target firmware information. Based on the extracted version information, the application instruction unit 96 determines whether or not the target firmware is applicable to the image forming apparatus 131 only after the firmware for which the download reservation was made has been downloaded and applied to the image forming apparatus 131 (step S166).

When the application instruction unit 96 determines that the target firmware is applicable to the image forming apparatus 131 whether or not firmware for which the download reservation was made has been downloaded and applied to the image forming apparatus 131, the application instruction unit 96 performs the following processing. The application instruction unit 96 provides instructions about reservation cancellation processing to the update control unit 81 provided in the image forming apparatus 131 (step S167). Reservation cancellation processing is processing for cancelling a firmware download reservation. The update control unit 81 that has been provided instructions about reservation cancellation processing cancels a firmware download reservation. Next, the second firmware acquisition unit 94 acquires the target firmware (step S168). Then, the application instruction unit 96 transmits the target firmware to the update control unit 131 provided in the image forming apparatus 133, and provides instructions to the update control unit 131 about applying the target firmware (step S169).

When the application instruction unit 96 determines that the target firmware is applicable to the image forming apparatus 131 only after firmware for which the download reservation was made has been downloaded and applied to the image forming apparatus 131, the following processing is executed. The second firmware acquisition unit 94 acquires the target firmware (step S170). Next, the application instruction unit 96 performs additional processing after a reservation has been applied (step S171). More specifically, the application instruction unit 96 transmits the acquired target firmware to the update control unit 81 provided in the image forming apparatus 131. The application instruction unit 96 provides instructions to the update control unit 81 about downloading the download-reserved firmware to be distributed from the distribution server 133 and applying the download-reserved firmware to the image forming apparatus 131. Also, the application instruction unit 96 provides instructions to the update control unit 81 about applying the target firmware to the image forming apparatus 131 after the firmware for which the download reservation was made has been applied to the image forming apparatus 133.

As apparent from the description with reference to FIGS. 10 to 12, the PC 140 executes the following processing when there is first firmware that has already been downloaded to the image forming apparatus 131. The PC 140 provides instructions to the image forming apparatus 131 about applying the difference package corresponding to the difference between the first firmware and the second firmware. With this arrangement, the firmware that has been updated is applied to the image forming apparatus. Therefore, according to the information processing apparatus of the present embodiment, even when the image forming apparatus cannot ensure a sufficient capacity for the update region for firmware, the firmware of the image forming apparatus can be efficiently updated. Also, according to the information processing apparatus of the present embodiment, the difference package can be acquired based on version information about the package included in each of the downloaded firmware information and the target firmware information.

Furthermore, according to the information processing apparatus of the present embodiment, when a firmware download reservation has been made on the image forming apparatus, the applied firmware can be updated after the application of firmware for which the download reservation was made without cancelling the reservation.

According to the present invention described above, when there is a first firmware that has already been downloaded to the image forming apparatus, data corresponding to the difference between the first firmware and the second firmware is transmitted to the image forming apparatus, whereby the updated firmware can be applied to the image forming apparatus. Consequently, even when the image forming apparatus cannot ensure a sufficient capacity for the update region of firmware, firmware of the image forming apparatus can be efficiently updated.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various, types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-106263 filed May 6, 2010, which is hereby incorporated by reference herein in its entirety.

What is claimed is:

1. A system for distributing and applying firmware, the system comprising:
   an image forming apparatus; and
   an information processing apparatus,
   wherein the information processing apparatus includes a processor coupled to a memory cooperating to function as:
   a first acquisition unit configured to acquire first firmware information that is information about a first firmware that has already been downloaded and has not yet been applied to the image forming apparatus,
   a second acquisition unit configured to acquire second firmware information that is information about a second firmware that matches the image forming apparatus,
   a difference data acquisition unit configured to acquire difference data based on a comparison result between the first firmware information and the second firmware information when the second firmware is selected to be applied to the image forming apparatus,
   an application instruction unit configured to provide an instruction to: (i) apply the first firmware and the difference data to the image forming apparatus when the second firmware is selected to be applied to the image forming apparatus, and (ii) apply the first firmware to the image forming apparatus when the first firmware is selected to be applied to the image forming apparatus,
   a third acquisition unit configured to acquire third firmware information that is information about a third firmware when the third firmware has been reserved for distribution to the image forming apparatus; and
   a determination unit configured to determine whether or not the second firmware is applicable to the image forming apparatus only after the third firmware has been applied to the image forming apparatus based on the second firmware information and the third firmware information when the second firmware is selected to be applied to the image forming apparatus,
   wherein the image forming apparatus includes an application unit configured to download the difference data and apply the difference data and the first firmware that has already been downloaded to the image forming apparatus according to an instruction provided by the application instruction unit when the application instruction unit provides the instruction to apply the difference data and the first firmware, to the image forming apparatus, and
   wherein the application instruction unit provides to the image forming apparatus an instruction about applying the second firmware after the third firmware has been downloaded and applied to the image forming apparatus when the determination unit determines that the second firmware is applicable to the image forming apparatus only after the third firmware has been applied to the image forming apparatus.

2. The system according to claim 1, wherein the first firmware information includes version information of data included in the first firmware, and the second firmware information includes version information of data included in the second firmware, and
   wherein the difference data acquisition unit acquires the difference data based on a comparison result between the version information of data included in the first firmware and the version information of data included in the second firmware.

3. A method for distributing and applying firmware to an image forming apparatus via a network, the method comprising:
   acquiring, in a first acquisition step, first firmware information that is information about a first firmware that has already been downloaded and has not yet been applied to the image forming apparatus;
   acquiring, in a second acquisition step, second firmware information that is information about a second firmware that matches the image forming apparatus;
   acquiring, in a difference data acquisition step, difference data based on a comparison result between the first firmware information and the second firmware information when the second firmware is selected to be applied to the image forming apparatus;
   providing, in an application instruction step, an instruction to: (i) apply the first firmware and the difference data to the image forming apparatus when the second firmware is selected to be applied to the image forming apparatus, and (ii) apply the first firmware to the image forming apparatus when the first firmware is selected to be applied to the image forming apparatus;
   acquiring, in a third acquisition step, third firmware information that is information about a third firmware when the third firmware has been reserved for distribution to the image forming apparatus;
   determining whether or not the second firmware is applicable to the image forming apparatus only after the third firmware has been applied to the image forming apparatus based on the second firmware information and the third firmware information when the second firmware is selected to be applied to the image forming apparatus,
   downloading the difference data and applying the difference data and the first firmware that has already been downloaded to the image forming apparatus to the image forming apparatus according to an instruction provided in the application instruction step when the instruction is provided to apply the difference data and the first firmware in the application instruction step; and
   applying the first firmware that has already been downloaded to the image forming apparatus without additionally downloading data according to a firmware according to an instruction provided in the application instruction step when the instruction is provided to apply the first firmware;

wherein the application instruction step provides to the image forming apparatus an instruction about applying the second firmware after the third firmware has been downloaded and applied to the image forming apparatus when the determination step determines that the second firmware is applicable to the image forming apparatus only after the third firmware has been applied to the image forming apparatus.

4. The system according to claim 1, wherein the difference data corresponds to a difference between the first firmware and the second firmware.

* * * * *